United States Patent
Finger et al.

(10) Patent No.: US 10,282,283 B2
(45) Date of Patent: May 7, 2019

(54) ORCHESTRATING AND PROVIDING A REGRESSION TEST

(71) Applicant: Accenture Global Solutions Limited, Dublin (IE)

(72) Inventors: Melissa Finger, Chicago, IL (US); Chinwendu A. Osuoha, Macomb Twp, MI (US); James Irlbeck, Lake Zurich, IL (US); Daniel P. Schmidt, Chicago, IL (US); Rhegina S. Gatuz, Chicago, IL (US); Gerald L. Hawkins, Canyon Lake, TX (US); Dattatray Joshi, Aurora, IL (US); Jonathan Herrera Francisco, Muntinlupa (PH)

(73) Assignee: Accenture Global Solutions Limited, Dublin (IE)

( * ) Notice: Subject to any disclaimer, the term of this patent is extended or adjusted under 35 U.S.C. 154(b) by 171 days.

(21) Appl. No.: 15/213,091

(22) Filed: Jul. 18, 2016

(65) Prior Publication Data
US 2017/0220458 A1 Aug. 3, 2017

Related U.S. Application Data

(60) Provisional application No. 62/288,074, filed on Jan. 28, 2016.

(51) Int. Cl.
*G06F 11/36* (2006.01)

(52) U.S. Cl.
CPC ........ *G06F 11/3688* (2013.01); *G06F 11/368* (2013.01); *G06F 11/3692* (2013.01)

(58) Field of Classification Search
CPC ............... G06F 11/368; G06F 11/3688; G06F 11/3692; G06F 11/36; G06F 11/362;
(Continued)

(56) References Cited

U.S. PATENT DOCUMENTS

| | | | | |
|---|---|---|---|---|
| 5,634,098 A | * | 5/1997 | Janniro | G06F 11/3688 707/999.104 |
| 6,701,514 B1 | * | 3/2004 | Haswell | G06F 11/3664 707/999.102 |

(Continued)

FOREIGN PATENT DOCUMENTS

| | | |
|---|---|---|
| EP | 1269321 | 6/2008 |
| EP | 2913757 | 9/2015 |
| GB | 2508643 | 6/2014 |

OTHER PUBLICATIONS

Athreya et al., "Application Quality Management," Oracle, Sep. 2011, last retrieved from http://www.oracle.com/technetwork/oem/pdf/511991.pdf on Mar. 4, 2018, 25 pp.*

(Continued)

*Primary Examiner* — Andrew M. Lyons
(74) *Attorney, Agent, or Firm* — Harrity & Harrity, LLP

(57) ABSTRACT

A device may receive information associated with an application to be tested. The device may identify test data associated with the application to be tested based on the received information. The device may associate the test data with a plurality of test cases. The device may associate the plurality of test cases with a test set. The device may associate the test set with a release. The device may provide the plurality of test cases and the test data, associated with the release, to the application to be tested. The device may receive a plurality of first results, and may compare the plurality of first results and a plurality of second results. The device may provide information for display based on comparing the plurality of first results and the plurality of second results.

20 Claims, 10 Drawing Sheets

(58) Field of Classification Search
CPC ............. G06F 11/3668; G06F 11/3672; G06F 11/3684; G06F 11/3696
USPC ................................................ 717/124–135
See application file for complete search history.

(56) References Cited

U.S. PATENT DOCUMENTS

| | | | |
|---|---|---|---|
| 7,373,636 B2 | 5/2008 | Barry et al. | |
| 8,117,591 B1* | 2/2012 | Michelsen | G06F 8/34 717/109 |
| 8,312,436 B2 | 11/2012 | Barry et al. | |
| 8,561,036 B1* | 10/2013 | Beans | G06F 11/368 717/124 |
| 8,649,995 B2* | 2/2014 | Thulasidasan | G06F 11/3684 702/119 |
| 9,606,903 B2* | 3/2017 | Murugesan | G06F 11/3688 |
| 9,612,929 B1* | 4/2017 | Dusanapudi | G06F 11/263 |
| 9,798,650 B1* | 10/2017 | Verma | G06F 11/3664 |
| 2005/0166094 A1 | 7/2005 | Blackwell et al. | |
| 2005/0188271 A1* | 8/2005 | West | G06F 11/3684 714/38.1 |
| 2006/0005067 A1* | 1/2006 | Llyod, Jr. | G06F 11/3414 714/4.1 |
| 2008/0244523 A1* | 10/2008 | Kelso | G06F 11/3664 717/124 |
| 2010/0057693 A1* | 3/2010 | Himstedt | G06F 11/3672 707/E17.005 |
| 2010/0180260 A1* | 7/2010 | Chikkadevaiah | G06F 11/3664 717/125 |
| 2010/0299561 A1* | 11/2010 | Marchant | G06F 11/3672 714/35 |
| 2011/0066486 A1* | 3/2011 | Bassin | G06Q 10/00 705/14.43 |
| 2011/0154292 A1 | 6/2011 | John et al. | |
| 2012/0030515 A1* | 2/2012 | Birakoglu | G06F 11/368 714/38.1 |
| 2012/0272206 A1* | 10/2012 | Sengupta | G06F 17/2705 717/101 |
| 2013/0152047 A1* | 6/2013 | Moorthi | G06F 11/368 717/124 |
| 2013/0239092 A1* | 9/2013 | Wieczorek | G06F 11/368 717/126 |
| 2013/0318402 A1* | 11/2013 | Rapp | G06F 11/3672 714/38.1 |
| 2014/0033009 A1* | 1/2014 | Rein | G06F 17/30011 715/212 |
| 2014/0040867 A1* | 2/2014 | Wefers | G06F 11/3684 717/131 |
| 2014/0279828 A1* | 9/2014 | Choudhary | G06F 17/30292 707/602 |
| 2014/0331212 A1* | 11/2014 | Gaikwad | G06F 11/3684 717/131 |
| 2015/0227452 A1* | 8/2015 | Raghavan | G06F 11/3684 717/124 |
| 2015/0254173 A1 | 9/2015 | Gupta | |
| 2016/0034468 A1* | 2/2016 | Hart | G06F 17/3053 707/751 |
| 2016/0062876 A1* | 3/2016 | Narayanan | G06F 11/3684 717/130 |
| 2016/0321170 A1* | 11/2016 | Ellis | G06F 11/3684 |
| 2017/0097882 A1* | 4/2017 | Chakraborty | G06F 11/3688 |

OTHER PUBLICATIONS

"Debugging," Wikipedia, Nov. 16, 2015, last retrieved from https://en.wikipedia.org/w/index.php?title=Debugging&oldid=690919742 on Aug. 27, 2018. (Year: 2015).*

"Regression testing," Wikipedia, Mar. 31, 2004, last retrieved from https://en.wikipedia.org/w/index.php?title=Regression_testing&oldid=3742884 on Aug. 27, 2018. (Year: 2004).*

G. Buchgeher, C. Ernstbrunner, R. Ramler and M. Lusser, "Towards Tool-Support for Test Case Selection in Manual Regression Testing," 2013 IEEE Sixth International Conference on Software Testing, Verification and Validation Workshops, Luxembourg, 2013, pp. 74-79. (Year: 2013).*

S. Elbaum, G. Rothermel, S. Karre and M. Fisher II, "Leveraging user-session data to support Web application testing," in IEEE Transactions on Software Engineering, vol. 31, No. 3, pp. 187-202, Mar. 2005. (Year: 2005).*

A. Nanda, S. Mani, S. Sinha, M. J. Harrold and A. Orso, "Regression testing in the presence of non-code changes," 2011 Fourth IEEE International Conference on Software Testing, Verification and Validation, Berlin, 2011, pp. 21-30. (Year: 2011).*

W. T. Tsai, A. Saimi, L. Yu and R. Paul, "Scenario-based object-oriented testing framework," Third International Conference on Quality Software, 2003. Proceedings., Dallas, TX, USA, 2003, pp. 410-417. (Year: 2003).*

B. Van Rompaey and S. Demeyer, "Exploring the composition of unit test suites," 2008 23rd IEEE/ACM International Conference on Automated Software Engineering—Workshops, L'Aquila, 2008, pp. 11-20. (Year: 2008).*

* cited by examiner

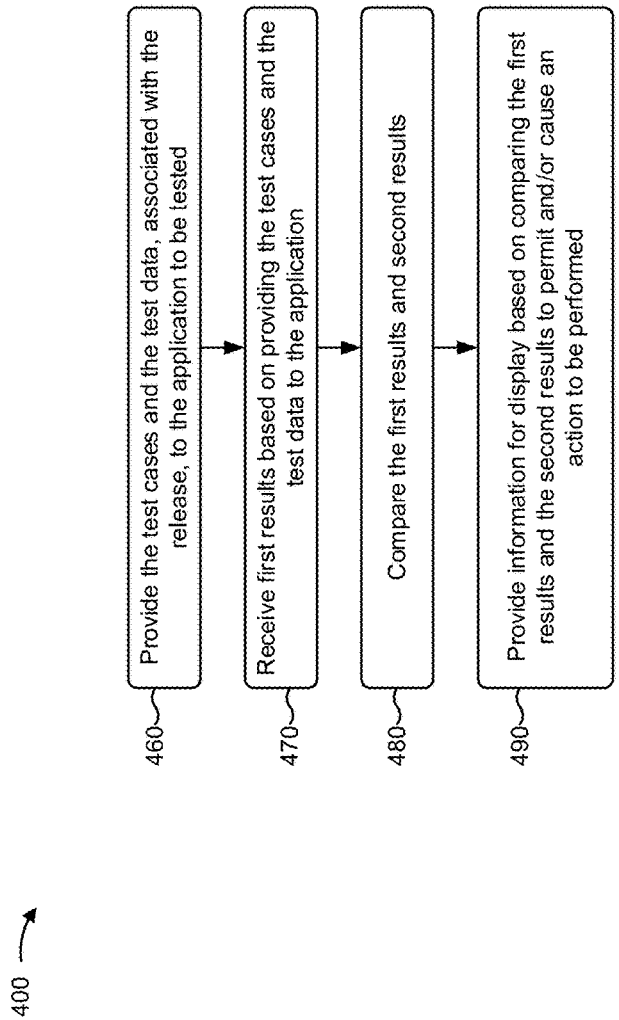

ORCHESTRATING AND PROVIDING A REGRESSION TEST

RELATED APPLICATION

This application claims priority under 35 U.S.C. § 119 to U.S. Provisional Patent Application No. 62/288,074, filed on Jan. 28, 2016, the content of which is incorporated by reference herein in its entirety.

BACKGROUND

Computer software may be modified either through an addition of new code, deletion of existing code, and/or a modification of existing code. A tester may perform a regression test to ensure that modifications to the software have not negatively affected other portions of the software. Regression testing may verify that previously developed and/or tested software continues to perform correctly despite the modifications.

SUMMARY

In some possible implementations, a device may include one or more processors. The one or more processors may receive information associated with an application to be tested. The one or more processors may identify test data associated with the application to be tested based on the received information. The one or more processors may associate the test data with a plurality of test cases. The one or more processors may associate the plurality of test cases with a test set. The one or more processors may associate the test set with a release. The one or more processors may provide the plurality of test cases and the test data, associated with the release, to the application to be tested. The one or more processors may receive a plurality of first results based on providing the plurality of test cases and the test data to the application to be tested. The one or more processors may compare the plurality of first results and a plurality of second results. The one or more processors may provide information for display based on comparing the plurality of first results and the plurality of second results to cause an action to be performed.

In some possible implementations, a non-transitory computer readable medium may store instructions. The instructions may cause a processor to receive information associated with an application under test. The instructions may cause the processor to identify test data associated with the application based on the received information. The instructions may cause the processor to associate the test data with a plurality of test cases. The instructions may cause the processor to associate the plurality of test cases with a test set. The instructions may cause the processor provide the plurality of test cases and the test data, associated with the test set, to the application to perform a regression test. The instructions may cause the processor to receive a plurality of first results based on providing the plurality of test cases and the test data to the application. The plurality of first results may be actual results. The instructions may cause the processor to compare the plurality of first results and a plurality of second results. The plurality of second results may be expected results associated with one or more regression tests performed prior to the performing the regression test. The instructions may cause the processor to provide information for display based on comparing the plurality of first results and the plurality of second results to permit an action to be performed.

In some possible implementations, a method may include associating, by a device, test data with a test case. The test case may be associated with a test scenario. The test data may include multiple dimensions corresponding to the test scenario. The method may include associating, by the device, the test case with a test set. The method may include associating, by the device, the test set with a release. The method may include providing, by the device, the test case and the test data to an application to be tested. The method may include receiving, by the device, an actual result based on providing the test case and the test data to the application. The method may include comparing, by the device, the actual result and the expected result. The expected result may be associated with another release that is prior to the release. The method may include providing, by the device, information for display based on comparing the actual result and the expected result to permit an action to be performed.

BRIEF DESCRIPTION OF THE DRAWINGS

FIGS. 4A and 4B are flow charts of an example process for orchestrating and providing a regression test.

DETAILED DESCRIPTION

The following detailed description of example implementations refers to the accompanying drawings. The same reference numbers in different drawings may identify the same or similar elements.

As part of the application development life-cycle, regression testing may be used to verify that previously developed and tested software continues to perform correctly after a modification to an application under test (AUT). A tester may run previously processed test cases, and may determine whether the AUT generates actual results that match expected results (e.g., baseline results generated by a known working version of the AUT). In some cases, a user may use a testing system to select a particular quantity of test cases, utilizing particular test data, to perform a regression test. However, in some cases, the selected quantity of test cases and/or the selected test data may not provide adequate test coverage (e.g., may fail to test particular test scenarios that may be affected by the modifications to the AUT, or the like). Additionally, in some cases, a testing system may be capable of comparing actual results with expected results that were generated as a part of the most recently performed regression test, and may not be capable of comparing actual results to other expected results that are associated with other previous regression tests. Further still, in some cases, a testing system may require a manual comparison of actual results to expected results.

Implementations described herein may enable a testing platform to orchestrate and provide an automated regression test that more accurately tests an AUT. For example, implementations described herein may enable a testing platform to identify tests associated with the AUT, identify test scenarios associated with the tests, and identify test data that corresponds to each identified test scenario. In this way, the testing platform may more accurately test functionalities of the AUT that may be affected by modifications to the AUT.

Additionally, implementations described herein may enable the testing platform to compare actual results with multiple sets of expected results that correspond to different iterations of previously performed regression tests. Further still, implementations described herein may reduce a quantity of manual processing of regression test results, thereby conserving processor and/or memory resources of computing devices associated with a testing system.

Figure 1A:
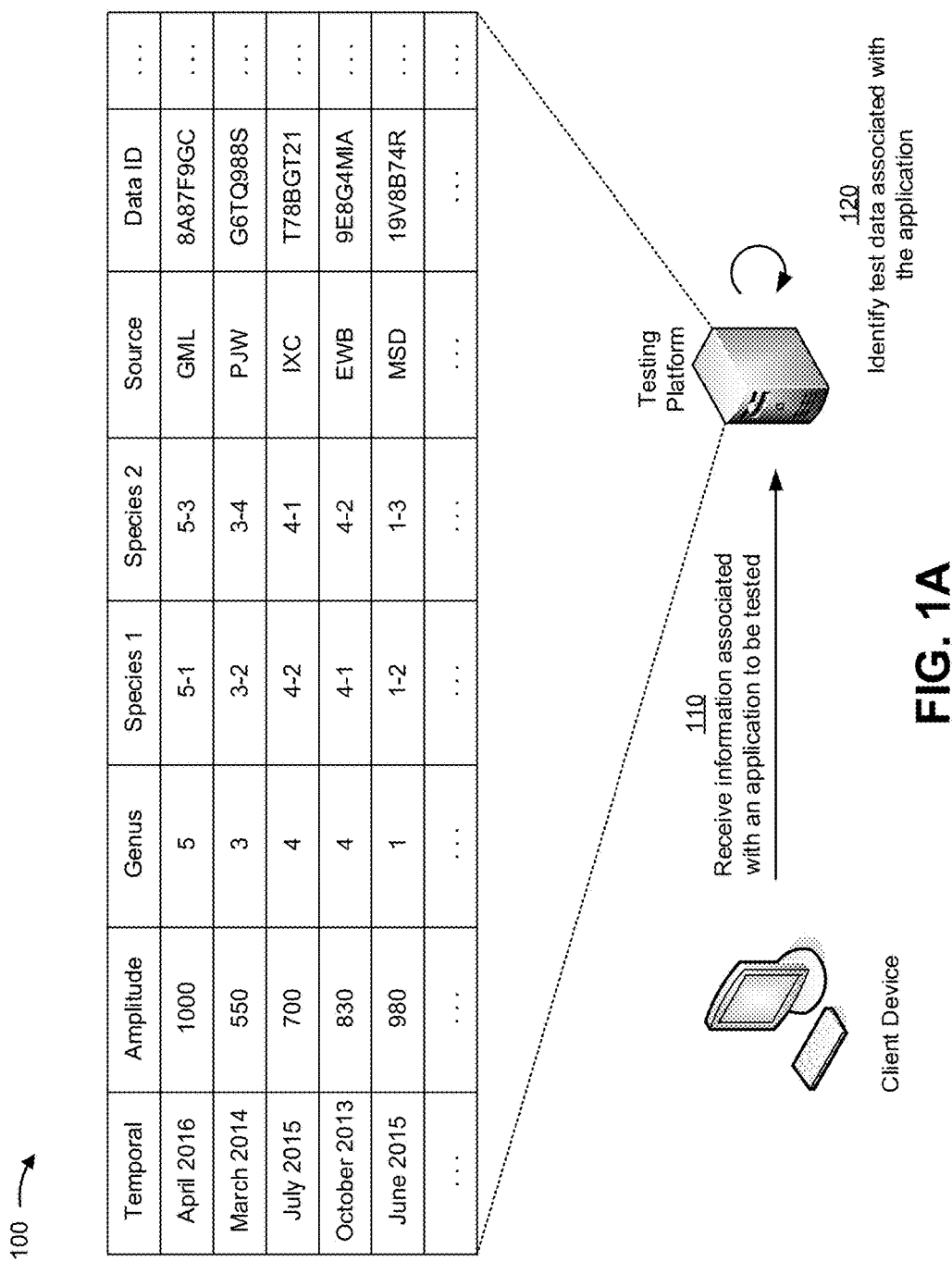
FIGS. 1A-1F are diagrams of an overview of an example implementation described herein.

FIGS. 1A-1F are diagrams of an overview of an example implementation 100 described herein. As shown in FIG. 1A, and by reference number 110, a testing platform (e.g., a cloud server) may receive, from a client device (e.g., a desktop computer), information associated with an application to be tested (e.g., an AUT). As an example, assume that the AUT is associated with a data processing system, and that the AUT may receive data, may process the data, and may determine an outcome (e.g., a result, or the like). The testing platform may receive, from the client device, information that identifies a test associated with the AUT and/or multiple test scenarios associated with the test and/or the AUT. A test may be used to determine whether a functionality associated with the AUT (e.g., an ability of the AUT to receive an input and generate a particular output) is implemented correctly and/or is not negatively affected by a modification of code associated with the AUT. A test scenario may refer to a particular combination of inputs that may cause the AUT to generate a particular output.

As shown by reference number 120, the testing platform may identify test data associated with the AUT. As an example, the AUT may identify test data associated with a repository database (e.g., a database that stores test data for testing the AUT). In some cases, the test data may be associated with multiple dimensions. A dimension may be capable of being associated with particular values, quantities, variables, indicators, etc. As shown, the test data may include multiple dimensions, such as "Temporal," "Amplitude," "Genus," "Species 1," "Species 2," "Source," "Data ID" and/or another dimension (not shown).

Figure 1B:
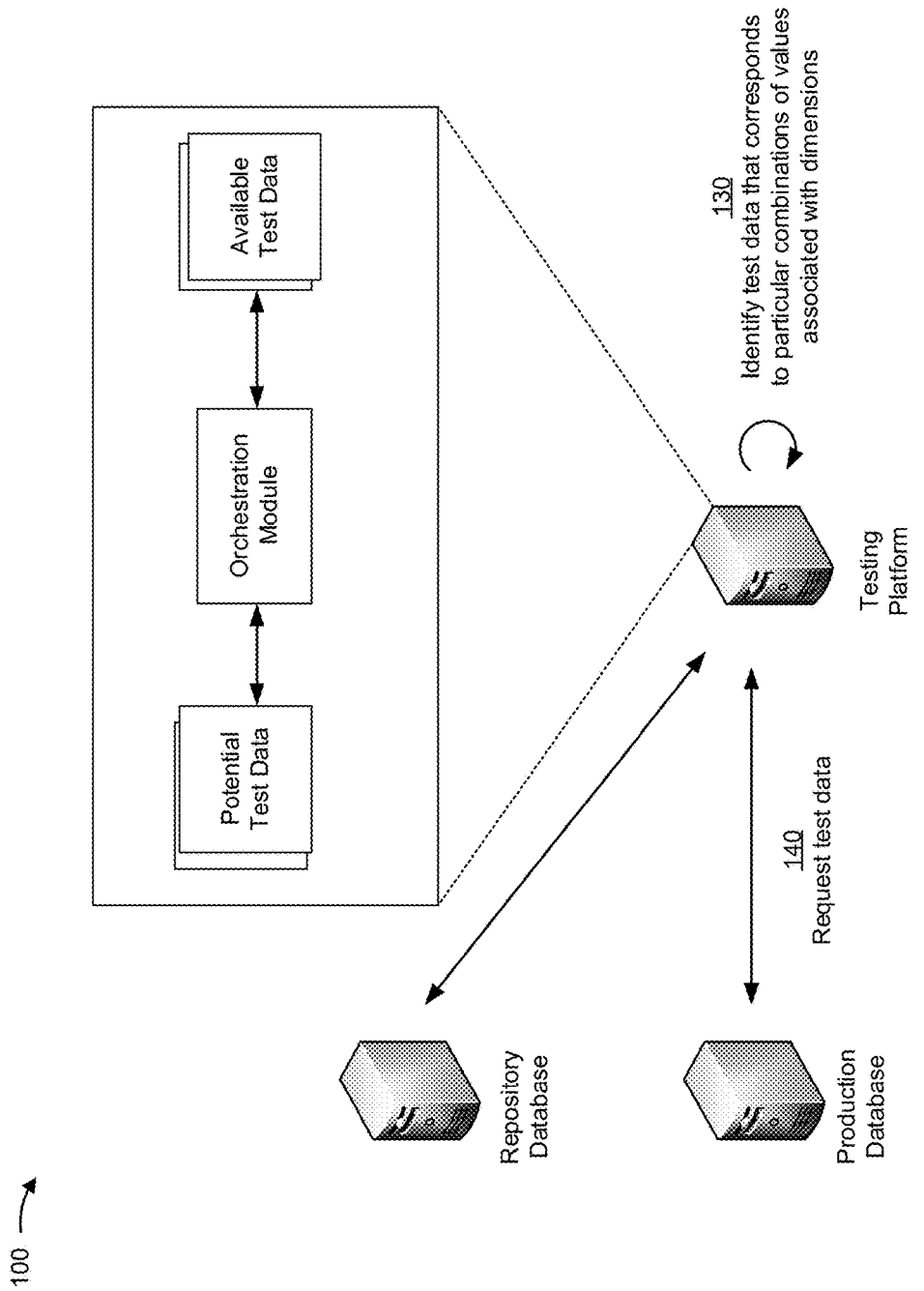

As shown in FIG. 1B, and by reference number 130, the testing platform (e.g., an orchestration module associated with the testing platform) may identify particular combinations of values associated with the dimensions, and may identify test data that corresponds to the particular combinations. As an example, the testing platform may identify test data (e.g., available test data) in the repository database, and may determine whether the test data includes each possible combination of dimension values, such that each test scenario is capable of being tested (e.g., may compare the available test data to potential test data). As shown by reference number 140, the testing platform may request test data from a production database (e.g., a database that stores data used by an entity associated with the AUT) based on determining that particular test data is not available for testing (e.g., is not stored in the repository database). Thus, the testing platform may more accurately perform a regression test based on providing enhanced test coverage.

Figure 1C:
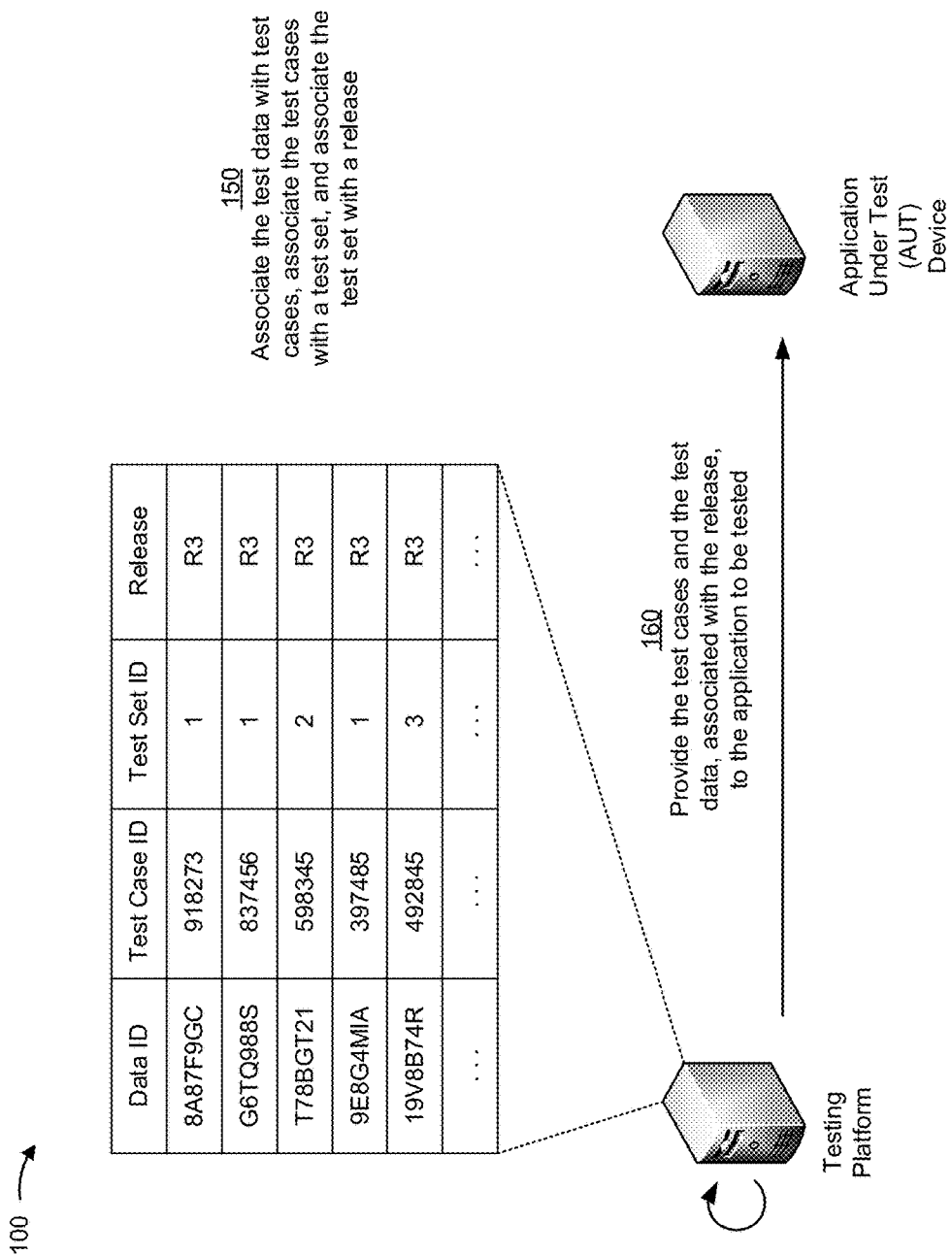

As shown in FIG. 1C, and by reference number 150, the testing platform may associate the test data with test cases, may associate the test cases with a test set, and may associate the test set with a release. As an example, a test case may include a particular set of inputs to the AUT that may cause the AUT to generate an output (e.g., a result). As shown, the testing platform may associate particular test data (e.g., based on a data identifier (Data ID)) with a test case (e.g., associated with a particular test case identifier). A test set may include a collection of test cases that are associated with a particular test (e.g., a test associated with a particular functionality of the AUT). A release may include a collection of test sets. As shown, the testing platform may associate particular test cases with particular test sets, and may associate the test sets with a release (e.g., "R3"). As shown by reference number 160, the testing platform may provide the test cases and the test data, associated with the release, to the AUT (e.g., a server device associated with the AUT) for execution.

Figure 1D:
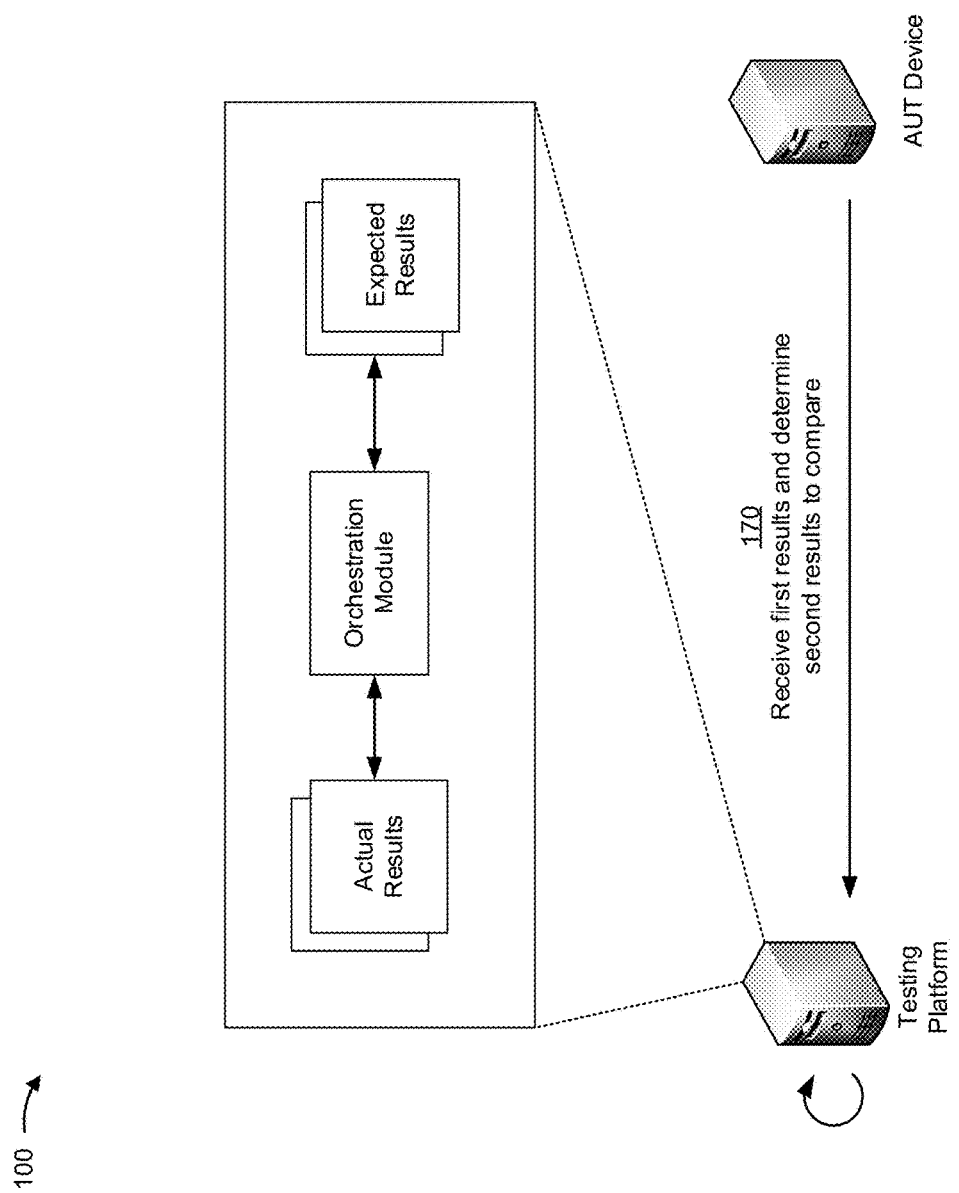

As shown in FIG. 1D, and by reference number 170, the testing platform may receive first results and determine second results to compare. The first results may include actual results. An actual result may include a result generated by the AUT. The second results may include expected results. An expected result may include a result generated by a known working version of the AUT (e.g., a baseline result). For example, the testing platform (e.g., the orchestration module) may identify test cases and/or test sets that are associated with the first results, and may determine corresponding test cases and/or test sets associated with actual results (e.g., groups of actual results). Additionally, the testing platform may determine second results based on determining the corresponding test cases and/or test sets.

Figure 1E:
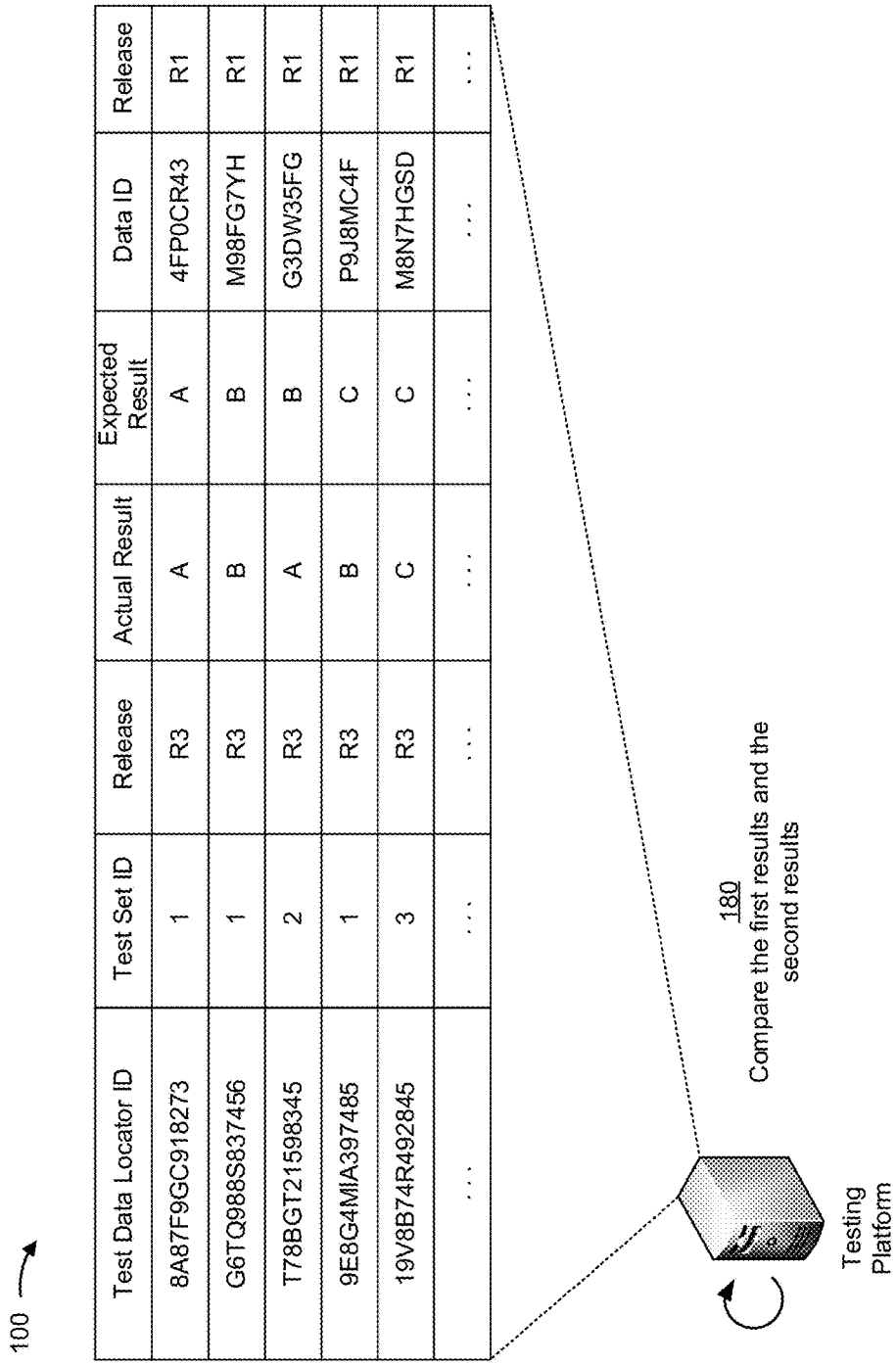

As shown in FIG. 1E, and by reference number 180, the testing platform may compare the first results and the second results. As shown, a test data locator identifier may include an identifier that combines a data identifier and a test case identifier. In some implementations, the AUT may generate a new data identifier for particular test data based on processing a test case associated with the particular test data. The test data locator identifier may enable traceability of results associated with particular test data between releases, as described elsewhere herein. Additionally, as shown, each test case may be associated with a particular actual result and a particular expected result. As shown, the expected results may be associated with a particular release (e.g., "R1," which may refer to a previous release).

Figure 1F:
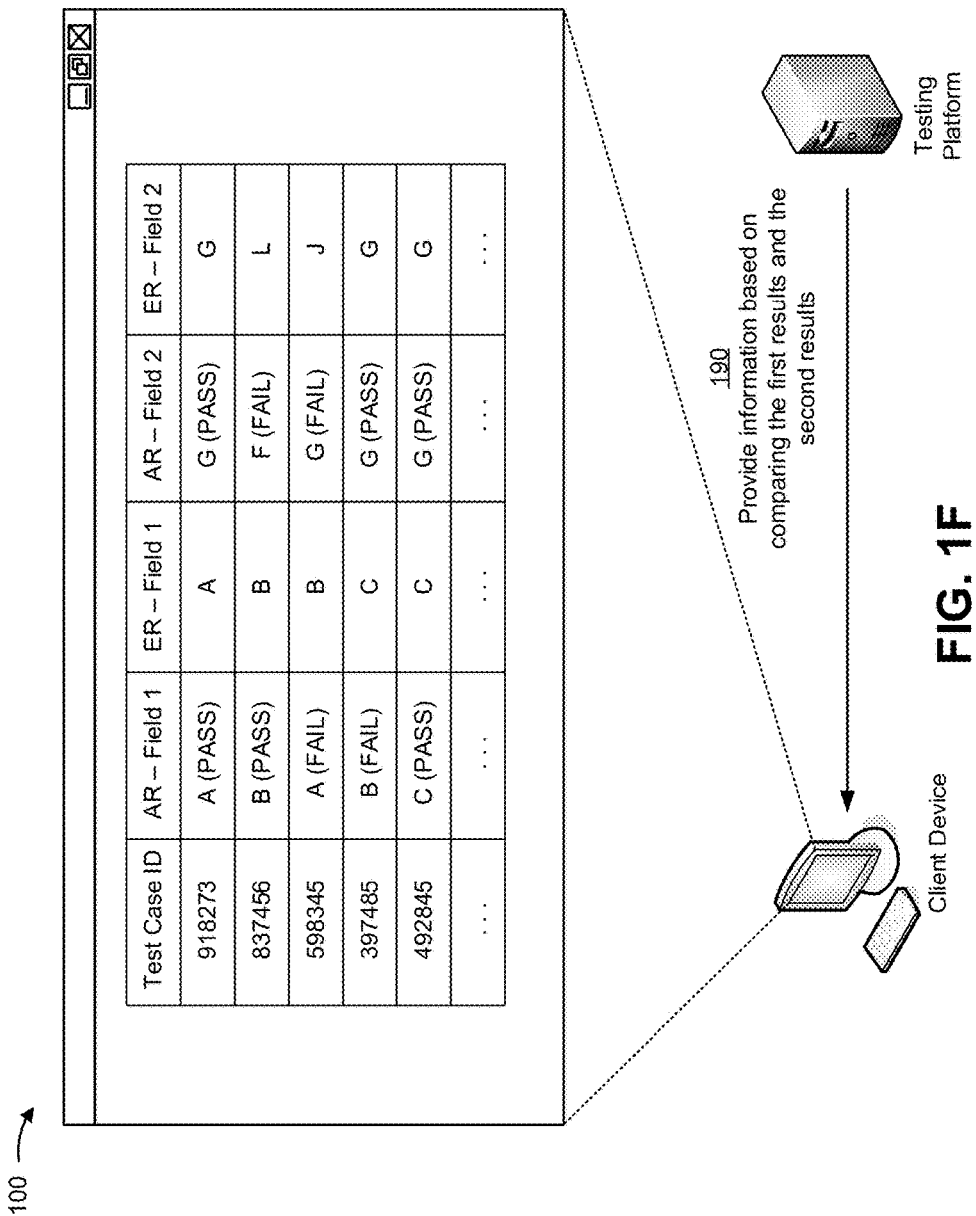

As shown in FIG. 1F, and by reference number 190, the testing platform may provide, to a client device, information based on comparing the first results and the second results. As shown, the testing platform may compare multiple fields, associated with the actual results, and corresponding fields that are associated with the expected results. A field may include a particular value associated with a result (e.g., an output of the AUT). As shown, for the test case associated with the test case identifier "837456," the testing platform may determine that a value (e.g., "B") associated with a field (e.g., "Field 1") matches between the actual result and the expected result. In this case, the testing platform may associate the match with a "pass" designation (e.g., because the AUT generated a result that matched an expected result). Further, the testing platform may determine that, for the same test case, another field (e.g., "Field 2") includes a value that does not match an expected value. In this case, the testing platform may associate the mismatch with a "fail" designation (e.g., because the AUT generated a result that did not match the expected result).

In some implementations, the testing platform (e.g., the orchestration module) may determine particular fields, a particular set of fields, etc. to compare. Additionally, the testing platform may determine particular fields to exclude from comparison. As shown, the client device may provide, for display via a user interface, information that identifies the actual results, the expected results, and designations (e.g., "pass" or "fail") associated with the actual results. A user (e.g., a subject matter expert, a developer, or the like) may identify an issue associated with the AUT based on the provided information.

Implementations described herein may enable a testing platform to orchestrate and provide a regression test and/or a test associated with an AUT. For example, implementations described herein may enable a testing platform to identify test scenarios associated with a test, and identify test data that may correspond to the identified test scenarios. Additionally, implementations described herein may enable the testing platform to compare actual results of a test and expected results associated with multiple previous tests (e.g., the most previous test, the second most previous test, etc.). In this way, the testing platform may provide more accurate testing based on testing each potential test scenario, which conserves processor and memory resources by reducing additional troubleshooting that might otherwise be needed.

As indicated above, FIGS. 1A-1F are provided merely as an example. Other examples are possible and may differ from what was described with regard to FIGS. 1A-1F.

Figure 2:
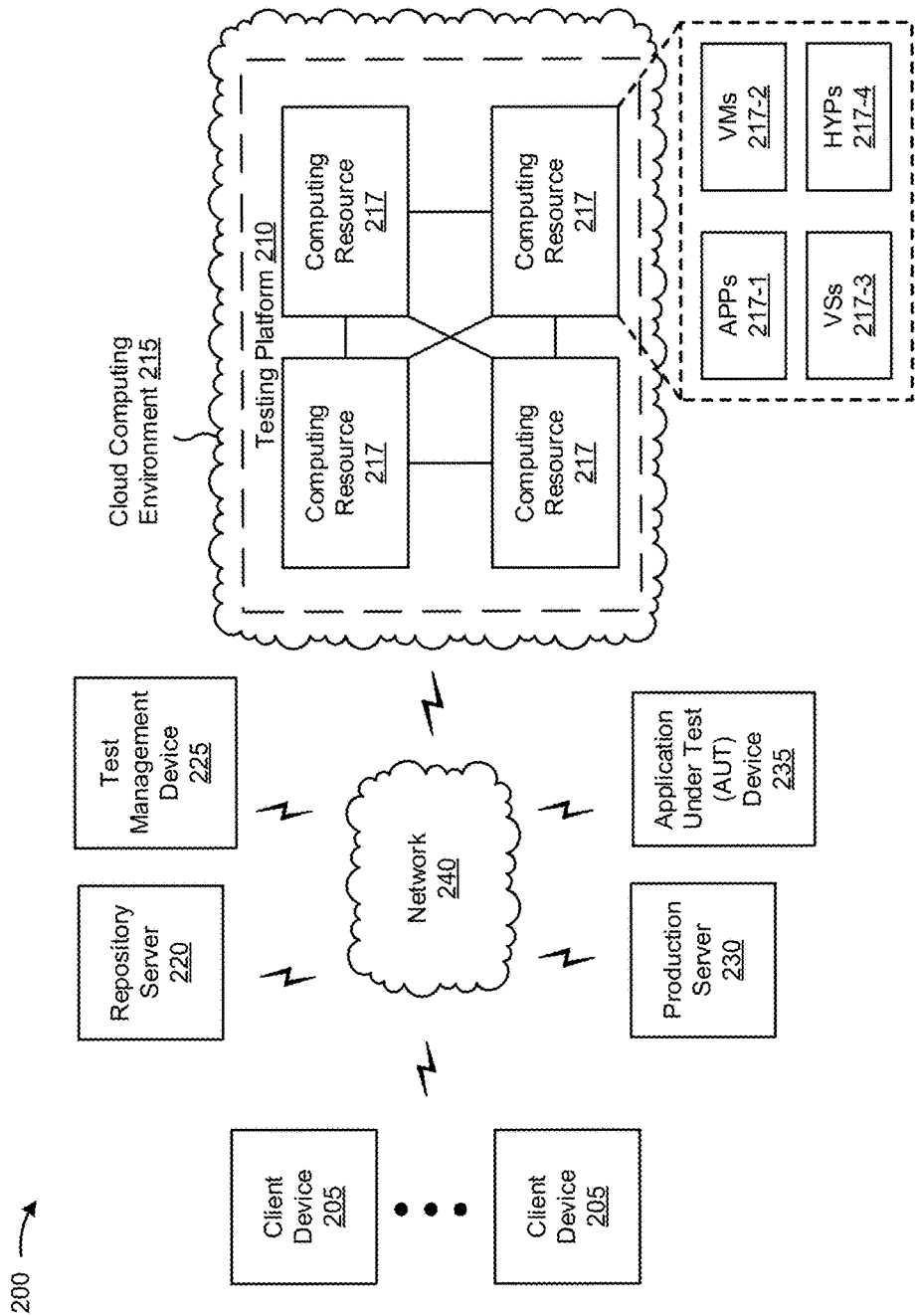
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include one or more client devices 205 (hereinafter referred to collectively as "client devices 205," and individually as "client device 205"), a testing platform 210 hosted within a cloud computing environment 215, a repository server 220, a test management device 225, a production server 230, an application under test (AUT) device 235, and a network 240. Devices of environment 200 may interconnect via wired connections, wireless connections, or a combination of wired and wireless connections.

Client device 205 includes one or more devices capable of receiving, generating, storing, processing, and/or providing information associated with testing platform 210. For example, client device 205 may include a computing device, such as a desktop computer, a laptop computer, a tablet computer, a server device, a mobile phone (e.g., a smart phone or a radiotelephone) or a similar type of device. In some implementations, client device 205 may receive information from testing platform 210 and may provide the information for display (e.g., via a user interface).

Testing platform 210 includes one or more devices capable of receiving information associated with an application to be tested, identifying data associated with the application, associating the data with test cases, associating the test cases with a test set, associating the test set with a release, and/or providing the test cases to an AUT, as described elsewhere herein. Additionally, testing platform 210 may receive actual results from the AUT, and may compare the actual results and expected results, as described elsewhere herein. For example, testing platform 210 may include a cloud server or a group of cloud servers. In some implementations, testing platform 210 may be designed to be modular such that certain software components can be swapped in or out depending on a particular need. As such, testing platform 210 may be easily and/or quickly reconfigured for different uses.

In some implementations, testing platform 210 may include one or more modules. For example, testing platform 210 may include an orchestration module that may compare available test data and potential test data, may determine test data to associate with a test case (or multiple test cases), may determine test sets to compare between releases, may determine fields to compare between results, or the like.

In some implementations, as shown, testing platform 210 may be hosted in cloud computing environment 215. Notably, while implementations described herein describe testing platform 210 as being hosted in cloud computing environment 215, in some implementations, testing platform 210 may not be cloud-based (i.e., may be implemented outside of a cloud computing environment) or may be partially cloud-based.

Cloud computing environment 215 includes an environment that hosts testing platform 210. Cloud computing environment 215 may provide computation, software, data access, storage, etc. services that do not require end-user (e.g., client device 205) knowledge of a physical location and configuration of system(s) and/or device(s) that hosts testing platform 210. As shown, cloud computing environment 215 may include a group of computing resources 217 (referred to collectively as "computing resources 217" and individually as "computing resource 217").

Computing resource 217 includes one or more personal computers, workstation computers, server devices, or another type of computation and/or communication device. In some implementations, computing resource 217 may host testing platform 210. The cloud resources may include compute instances executing in computing resource 217, storage devices provided in computing resource 217, data transfer devices provided by computing resource 217, etc. In some implementations, computing resource 217 may communicate with other computing resources 217 via wired connections, wireless connections, or a combination of wired and wireless connections.

As further shown in FIG. 2, computing resource 217 includes a group of cloud resources, such as one or more applications ("APPs") 217-1, one or more virtual machines ("VMs") 217-2, virtualized storage ("VSs") 217-3, one or more hypervisors ("HYPs") 217-4, or the like.

Application 217-1 includes one or more software applications that may be provided to or accessed by client device 205. Application 217-1 may eliminate a need to install and execute the software applications on client device 205. For example, application 217-1 may include software associated with testing platform 210 and/or any other software capable of being provided via cloud computing environment 215. In some implementations, one application 217-1 may send/receive information to/from one or more other applications 217-1, via virtual machine 217-2.

Virtual machine 217-2 includes a software implementation of a machine (e.g., a computer) that executes programs like a physical machine. Virtual machine 217-2 may be either a system virtual machine or a process virtual machine, depending upon use and degree of correspondence to any real machine by virtual machine 217-2. A system virtual machine may provide a complete system platform that supports execution of a complete operating system ("OS"). A process virtual machine may execute a single program, and may support a single process. In some implementations, virtual machine 217-2 may execute on behalf of a user (e.g., client device 205), and may manage infrastructure of cloud computing environment 215, such as data management, synchronization, or long-duration data transfers.

Virtualized storage 217-3 includes one or more storage systems and/or one or more devices that use virtualization techniques within the storage systems or devices of computing resource 217. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 217-4 may provide hardware virtualization techniques that allow multiple operating systems (e.g., "guest operating systems") to execute concurrently on a host computer, such as computing resource 217. Hypervisor 217-4 may present a virtual operating platform to the guest operating systems, and may manage the execution of the guest operating systems. Multiple instances of a variety of operating systems may share virtualized hardware resources.

Repository server 220 includes one or more devices capable of receiving, storing, and/or providing information for use by testing platform 210. For example, repository server 220 may include a server or a group of servers (e.g., a cloud-based server, an application server, a content server, a host server, a web server, a database server, etc.), a desktop computer, or a similar device. In some implementations, repository server 220 may provide test data to testing platform 210.

Test management device 225 includes one or more devices capable of receiving, storing, and/or providing information for use by testing platform 210. For example, test management device 225 may include a server or a group of servers (e.g., a cloud-based server, an application server, a content server, a host server, a web server, a database server, etc.), a desktop computer, or a similar device. In some implementations, test management device 225 may provide information associated with a test and/or a test case to testing platform 210.

Production server 230 includes one or more devices capable of receiving, storing, and/or providing information for use by testing platform 210. For example, production server 230 may include a server or a group of servers (e.g., a cloud-based server, an application server, a content server, a host server, a web server, a database server, etc.), a desktop computer, or a similar device. In some implementations, production server 230 may provide test data to repository server 220 and/or testing platform 210.

Application under test (AUT) device 235 includes one or more devices capable of receiving, storing, and/or providing information for use by testing platform 210. For example, AUT device 235 may include a server or a group of servers (e.g., a cloud-based server, an application server, a content server, a host server, a web server, a database server, etc.), a desktop computer, or a similar device. In some implementations, AUT device 235 may provide information associated with an AUT to testing platform 210.

Network 240 may include one or more wired and/or wireless networks. For example, network 240 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
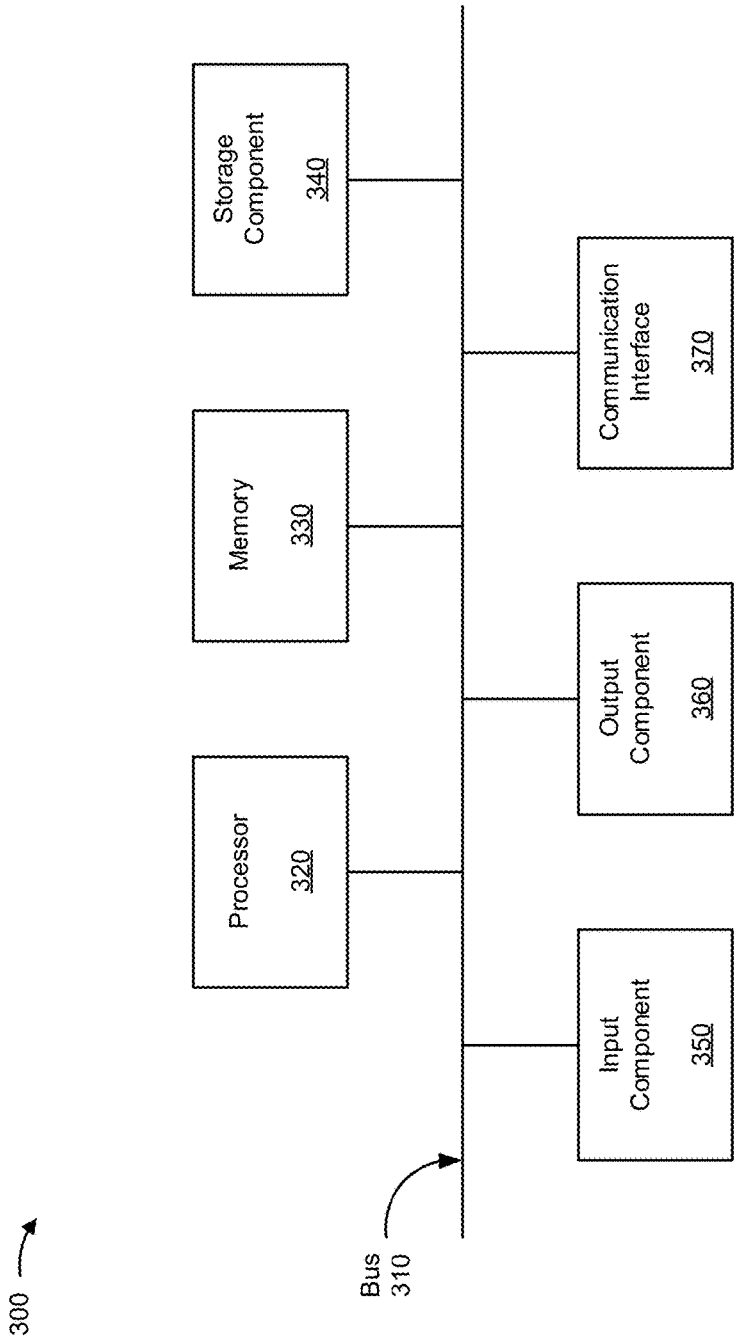
FIG. 3 is a diagram of example components of one or more devices of FIG. 2.

FIG. 3 is a diagram of example components of a device 300. Device 300 may correspond to client device 205, testing platform 210, repository server 220, test management device 225, production server 230, and/or AUT device 235. In some implementations, client device 205, testing platform 210, repository server 220, test management device 225, production server 230, and/or AUT device 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
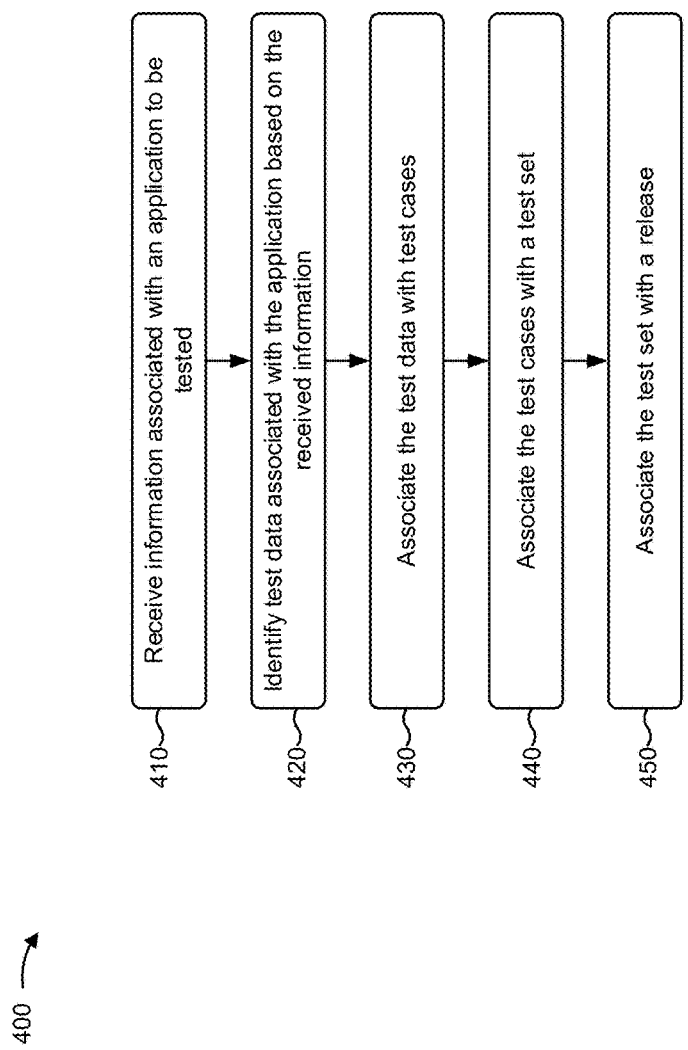

FIGS. 4A and 4B are flow charts of an example process 400 for orchestrating and providing a regression test. In some implementations, one or more process blocks of FIGS. 4A and 4B may be performed by testing platform 210. In some implementations, one or more process blocks of FIGS. 4A and 4B may be performed by another device or a group of devices separate from or including testing platform 210, such as client device 205, repository server 220, test management device 225, production server 230, and/or AUT device 235.

As shown in FIG. 4A, process 400 may include receiving information associated with an application to be tested (block 410). For example, testing platform 210 may receive information associated with an AUT or system under test (SUT). In some implementations, the AUT (or SUT) may include a software program that includes modified code, such as added code, revised code, deleted code, and/or the like. In some implementations, the modified code may enable additional functionality associated with the AUT, and the AUT may be tested to ensure that the additional functionality is implemented correctly and/or does not negatively impact the AUT. Additionally, or alternatively, the AUT may be retested to ensure that the modified code does not negatively affect existing functionality associated with the AUT (e.g., a regression test may be performed). In some implementations, the AUT may include a transaction processing system. For example, the AUT may include a claims processing system that may receive data (e.g., a claim) associated with a transaction, may process the data, and may determine a transaction outcome.

In some implementations, the information may identify a test associated with the AUT. The AUT may include functionality that permits the AUT to receive an input (or multiple inputs) and generate an output. In some implementations, a test may be used to determine whether the functionality is implemented correctly (e.g., whether the AUT generates a correct and/or expected output). For example, a functionality associated with the AUT may include receiving data, processing the data, and generating an outcome. As an example, the AUT may receive transaction data that indicates that a healthcare subscriber received healthcare services, that the rendered services totaled a particular amount (e.g., $1,000.00), and that a deductible amount associated with the subscriber is a particular amount (e.g., $1,200.00). In this case, the AUT may determine that an out-of-pocket expense associated with the rendered services is $1,000.00 (e.g., because the deductible amount was not met). Additionally, in this case, a test may determine whether the AUT generated the correct outcome based on the transaction data.

Additionally, the information may identify test scenarios associated with a test. A test scenario may refer to a particular combination of inputs, associated with test data (e.g., transaction data), that may cause the AUT to generate a particular output. In some implementations, test data associated with the AUT may include multiple dimensions. A dimension may be capable of being associated with multiple values, quantities, variables, etc. For example, test data may be associated with a temporal dimension (e.g., relating to a time and/or date), an amplitude dimension (e.g., relating to a cost, an amount, a quantity, or the like), a genus dimension (e.g., relating to a category, a classification, a group, or the like), a species dimension (e.g., relating to a sub-category, a sub-classification, a sub-group, or the like), a source dimension (e.g., relating to an origin of the test data, or the like), or the like.

As an example, a healthcare claim (e.g., an electronic data interchange (EDI) 837 claim) may include multiple dimensions, such as a line of business dimension, a state dimension, a claim type dimension, an application dimension, and/or another dimension. Additionally, as an example, a particular dimension (e.g., a claim type dimension) may include multiple potential values (e.g., "institutional inpatient," "institutional outpatient," "professional," or the like). In some implementations, particular combinations and/or permutations of dimension values may represent particular test scenarios. Additionally, the AUT may generate particular outputs based on particular test scenarios.

In some implementations, testing platform 210 may identify test data, to be used to test the AUT, based on receiving information that identifies a test and/or test scenarios associated with the AUT, as described below.

As further shown in FIG. 4A, process 400 may include identifying test data associated with the application based on the received information (block 420). For example, testing platform 210 may identify test data, to be used to test the AUT, based on the received information. In some implementations, testing platform 210 may identify test data associated with the AUT based on the information that identifies tests and/or test scenarios. Additionally, testing platform 210 may identify particular tests and/or particular test scenarios that may be affected based on the modification(s) to the AUT, and may determine test data associated with the particular tests and/or particular test scenarios. For example, testing platform 210 may identify dimensions associated with the test scenarios, and may determine whether test data is available for testing the particular test scenarios (e.g., may identify whether test data including different combinations and/or permutations of dimension values, that correspond to particular test scenarios, is stored in repository server 220). In this way, testing platform 210 may enable more accurate testing of the AUT by improving regression test coverage and minimizing risk associated with inadequate regression test coverage, which conserves processor and memory resources by reducing additional troubleshooting and/or retesting that might otherwise be needed.

In some implementations, testing platform 210 may identify test data, associated with a database (e.g., stored in a database associated with repository server 220), and may compare the test data and the test scenarios associated with the AUT. In some implementations, repository server 220 may store test data to be used to test the AUT. Additionally, testing platform 210 may identify test scenarios associated with the AUT, and may determine whether test data associated with each test scenario is stored in the database associated with repository server 220 (e.g., is available for testing the AUT).

In some implementations, testing platform 210 may determine that test data associated with a particular test scenario does not exist in the database associated with repository server 220, and may provide a request for test data associated with the particular test scenario to another database (e.g., a database associated with production server 230). For example, testing platform 210 may provide a request (e.g., a structured query language (SQL) query) to production server 230 for test data associated with a test scenario for which repository server 220 does not include corresponding test data. In some implementations, production server 230 may store data that may be used by an entity associated with the AUT. For example, assume that the entity associated with the AUT is a healthcare provider. In this case, production server 230 may store transaction data (e.g., claims) that may be associated with the entity (e.g., submitted to the entity for processing).

In some implementations, testing platform 210 may provide a request for test data associated with particular dimensions and/or values associated with the particular dimensions. For example, assume that the AUT is a healthcare claim processing system. In this case, testing platform 210 may request test data associated with particular dimensions (e.g., line of business, application, state, claim type, product type, network, relationship, patient age, adjustment, restriction, delivery method, and/or another dimension). Additionally, testing platform 210 may request test data associated with various combinations of dimension values associated with the particular dimensions. In some implementations, testing platform 210 may more accurately provide regression testing based on using test data associated with the above dimensions.

In some implementations, testing platform 210 may receive, from production server 230, test data associated with particular test scenarios and may store the test data for testing (e.g., using repository server 220). In this way, testing platform 210 may identify particular test scenarios for which test data is not available, may request the test data, and may receive the test data corresponding to the particular test scenarios such that the test data is available for testing. Additionally, in this way, testing platform 210 may more accurately perform a regression test based on testing each test scenario associated with a test, as described elsewhere herein.

As further shown in FIG. 4A, process 400 may include associating the test data with test cases (block 430). For example, testing platform 210 may associate particular test data with a test case, or multiple test cases, which may be used for testing the AUT. In some implementations, a test case may include a particular set of inputs, to the AUT, that may cause the AUT to generate a result. Additionally, a test case may be associated with an expected result. For example, an expected result may include a result associated with a known working version of the AUT (e.g., a baseline version). Additionally, an expected result may include a result that is associated with a particular outcome (e.g., a previous outcome, an anticipated outcome, a correct outcome, etc.). In some implementations, a test case may be associated with a particular test scenario. In some implementations, associating test data with a test case may refer to storing information that relates test data with a test case (e.g., relating in a data structure).

In some implementations, testing platform 210 may receive, from client device 205 (e.g., which may have received an input from a user), information that associates test data with a test case. In some implementations, a user may interact with client device 205 to search for test data to associate with a test case. For example, client device 205 may provide a user interface via which a user may interact to associate test data with a test case. In some implementations, a user may interact with client device 205 to search for test data, to associate with a test case, based on a transaction identifier. A transaction identifier may include a designation that identifies particular transaction data and/or test data (e.g., a data identifier). In some implementations, the AUT may generate a transaction identifier for particular transaction data and/or test data based on processing the particular data. For example, assume that the AUT is associated with a claims processing system. In this case, the AUT may generate a transaction identifier (e.g., a document control number (DCN)) for particular transaction data and/or test data (e.g., a claim) based on processing the particular data.

Additionally, or alternatively, a user may interact with client device 205 to search for test data, to associate with a test case, based on a dimension. For example, client device 205 may provide a menu (e.g., a drop down menu, a check box, or the like) associated with a dimension, and a user may interact with client device 205 to select a particular value associated with a dimension. Additionally, a user may select particular values for multiple dimensions associated with a test scenario. Testing platform 210 may receive (e.g., based on the user interaction with client device 205) the user selection of the values associated with the dimensions, and may identify test data associated with the selected values (e.g., test data that matches the test scenario associated with the selected values). Testing platform 210 may provide test data that matches the selected values to client device 205, and client device 205 may provide the identified test data for display. Additionally, a user may interact with client device 205 to select particular test data to associate with a test case based on the identified test data. In some implementations, testing platform 210 may provide information that identifies that test data is associated with a test case. In this way, a user may determine that particular test data is already associated with a test case, and may not select the particular test data to be associated with another test case. Additionally, in this way, testing platform 210 may provide more accurate regression testing, which conserves processor and memory resources by reducing additional troubleshooting and/or retesting that might otherwise be needed.

In some implementations, testing platform 210 may determine whether client device 205, that is requesting test data to associate with a test case, is associated with a particular location (e.g., an "offshore" location, such as a foreign geographic location as compared to a location associated with an entity associated with the AUT) or is not associated with a particular location (e.g., a same geographic location as the location associated with the entity associated with the AUT). When testing platform 210 determines that client device 205 is associated with the offshore location or is not associated with the same geographic location, testing platform 210 may filter particular test data (e.g., may not provide the particular test data to client device 205).

Additionally, or alternatively, a user may interact with client device 205 to generate test data to associate with a test case. For example, a user may interact with client device 205 to input particular values corresponding to particular dimensions associated with a test scenario. In some implementations, a user may modify test data (e.g., may modify a value associated with a dimension), and testing platform 210 may generate test data based on the modification. For example, assume that the AUT includes new functionality that may result in the AUT generating results in a different manner than a previous version of the AUT. In this case, a user may edit a value associated with a dimension, in order to determine whether the AUT generates a particular result based on the new functionality.

In some implementations, a user may interact with client device 205 to input particular values corresponding to particular dimensions, and testing platform 210 may identify test data that is associated with the particular values (e.g., includes identical values, includes values that match a threshold quantity of dimensions, etc.). Additionally, or alternatively, testing platform 210 may enable a user to edit test data (e.g., may edit values associated with particular dimensions, or the like). Additionally, or alternatively, testing platform 210 may generate test data based on the input information.

In some implementations, testing platform 210 may provide the generated test data (e.g., generated based on the dimension values received via user input) to a particular test environment (e.g., a user acceptance testing (UAT) environment) of AUT device 235. As described elsewhere herein, AUT device 235 may generate a result based on the test data. In this way, testing platform 210 may receive information that identifies a result associated with the test data, and may compare the result with an expected result (e.g., an expected outcome). In this way, a user may verify whether the AUT is implementing the new functionality correctly, accurately, etc.

Additionally, or alternatively, a user may interact with client device 205 to replace test data associated with a test case. For example, assume that particular data is associated with a test case, and that the particular test data is invalid. For example, in this case, the test data may include a particular value, associated with a particular dimension, that may cause the AUT to generate an error and/or may cause the AUT to not process the data. In some implementations, testing platform 210 may identify replacement test data that includes values, associated with particular dimensions, that match values associated with the invalid test data. Additionally, the replacement test data may include a value, associated with a dimension that is causing the error, that is different than the invalid test data. In this way, a user may replace the invalid test data with replacement test data that matches values associated with the invalid test data.

In some implementations, testing platform 210 may receive, from client device 205, information that associates test data with a test case, and may store the test case. In some implementations, testing platform 210 may provide the test case to test management device 225, and test management device 225 may store the test case. In some implementations, testing platform 210 may store an expected result associated with a test case. For example, an expected result may be associated with a previous test of the test case (e.g., a baseline result), an anticipated result (e.g., a user identified result, a predicted result, etc.), or the like.

In some implementations, testing platform 210 may associate a test case identifier with a test case. For example, a test case identifier may identify a particular test case. Additionally, testing platform 210 may associate a test data locator identifier with a test case. For example, a test data locator identifier may include a combination of a transaction identifier and a test case identifier (e.g., a concatenation of the transaction identifier and the test case identifier, or the like). A test data locator identifier may be used to compare a test case, associated with a release, and a test case associated with another release, as described elsewhere herein. In this way, testing platform 210 may enable traceability between test cases associated with different releases, as described elsewhere herein.

In some implementations, testing platform 210 may associate a test scenario identifier with a test case. For example, assume that a test case is associated with a particular test. Further, assume that the test is associated with multiple test scenarios. In this case, each test scenario, of the multiple test scenarios, may be associated with a corresponding test scenario identifier. In some implementations, testing platform 210 may identify test data associated with a particular test scenario, and may associate the test data with a test scenario identifier. Additionally, testing platform 210 may associate the test data with a test case. In this way, testing platform 210 may associate test data, associated with each test scenario, with a corresponding test case. Additionally, in this way, testing platform 210 may provide more accurate regression testing based on testing test data associated with each potential test scenario.

In some implementations, testing platform 210 may associate test data with a test case, and may store the test case, a test case identifier, an expected result, a test data locator identifier, and/or other information in a data structure. Additionally, or alternatively, testing platform 210 may provide the test case and/or other information to test management device 225, and test management device 225 may store the test case. In this way, testing platform 210 may associate test data with a test case, which may allow testing platform 210 to associate multiple test cases with a test set, as described below.

As further shown in FIG. 4A, process 400 may include associating the test cases with a test set (block 440), and associating the test set with a release (block 450). For example, testing platform 210 may associate the test cases with a test set, and may associate the test set with a release. A test set may include a collection (e.g., a group) of test cases that are associated with a particular test (e.g., that tests a particular functional aspect of the AUT). A release may include a collection of test sets.

In some implementations, testing platform 210 may associate a test set identifier with a test set. Additionally, or alternatively, testing platform 210 may associate a release identifier with a release. In some implementations, testing platform 210 and/or test management device 225 may store test cases, test sets, and/or associated identifiers (e.g., test case identifiers, test set identifiers, release identifiers, test data locator identifiers, or the like), as being related, in a data structure. In this way, testing platform 210 may provide test cases to the AUT to perform a regression test, as described below.

As shown in FIG. 4B, process 400 may include providing the test cases and the test data, associated with the release, to the application to be tested (block 460). For example, testing platform 210 may provide each test case and corresponding test data, associated with a test set and/or release, to the AUT to perform a test and/or regression test. In some implementations, testing platform 210 may provide the test cases and the test data to the AUT based on an input from client device 205 (e.g., which may have received an input from a user). In some implementations, testing platform 210 may provide the test cases and the test data to the AUT without any input from client device 205. In some implementations, test management device 225 may store the test cases, and may provide the test cases and the test data to the AUT based on an instruction from testing platform 210.

In some implementations, the AUT may be associated with a test environment. For example, the AUT may be associated with AUT device 235, which may include multiple test environments (e.g., UAT environments). In some implementations, a test environment may include a particular state of code associated with the AUT. Additionally, different test environments may include different states of code associated with the AUT.

In some implementations, testing platform 210 may provide the test cases and the test data to a particular test environment of AUT device 235. For example, testing platform 210 may receive, from client device 205, information that identifies a particular environment associated with the AUT. Additionally, testing platform 210 may provide the test cases and the test data to the particular environment for execution. In some implementations, testing platform 210 may provide input values, corresponding to test cases, to the AUT for execution. The AUT may generate output values based on the input values, as described below.

As further shown in FIG. 4B, process 400 may include receiving first results based on providing the test cases and the test data to the application (block 470). For example, testing platform 210 may receive, from the AUT, actual results based on providing the test cases and the test data to the AUT for execution. In some implementations, an actual result may refer to a result generated by the AUT (e.g., based on processing a test case). For example, the AUT may receive input values, associated with a test case, may process the input values, and may generate an output value or values. In some implementations, the AUT may generate a result that includes multiple fields. For example, a field may include an output value associated with the AUT (e.g., generated by the AUT).

In some implementations, the AUT may generate a transaction identifier based on processing a test case. For example, the AUT may generate a transaction identifier for a test case each time the test case is processed. In this way, a test case may be associated with multiple transaction identifiers that correspond to different instances in which the test case was processed (e.g., correspond to different releases).

In some implementations, testing platform 210 may receive the first results, and may associate each result with a corresponding test case identifier. Additionally, testing platform 210 may associate a generated transaction identifier, associated with a test case, with the test case identifier. Additionally, testing platform 210 may generate a test data locator identifier based on the generated transaction identifier and the test case identifier. In this way, testing platform 210 may enable a comparison between results, associated with a test case, for multiple releases, as described elsewhere herein.

In some implementations, testing platform 210 may store, in a data structure, the first results and/or identifiers associated with the first results. Additionally, testing platform 210 may compare the first results and other results, as described below.

As further shown in FIG. 4B, process 400 may include comparing the first results and second results (block 480), and providing information for display based on comparing first results and the second results to permit and/or cause an action to be performed (block 490). For example, testing platform 210 may compare the first results and second results associated with a previous test (e.g., release) of the AUT (e.g., expected results), and may provide information associated with the comparison to client device 205 (e.g., which may provide the information for display via a user interface). In some implementations, the second results may include expected results associated with a most recent test of the AUT (e.g., the last instance of AUT testing previous to the current test). Alternatively, the second results may include expected results associated with another previous test of the AUT (e.g., the nth previous test, where n is greater than one). In some implementations, the second results may include a result associated with previous tests (e.g., an average result, a median result, a most common result, or the like).

In some implementations, testing platform 210 may compare the first results and the second results based on test data locator identifiers (e.g., a combination of a test case identifier and a transaction identifier). For example, testing platform 210 may identify a particular test case based on a test case identifier, and may identify different results associated with the test case based on different transaction identifiers. As an example, the AUT may generate a unique transaction identifier for each test of the test case. Thus, the unique transaction identifier, combined with the test case identifier, may enable comparisons across releases (e.g., different testing instances). In this way, testing platform 210 may compare a test case, that was processed as part of a particular release, with the same test case that was processed as part of a prior release or multiple prior releases.

In some implementations, testing platform 210 may compare the first results and the second results. For example, testing platform 210 may determine whether multiple fields associated with the first results (e.g., actual results) match corresponding fields associated with the second results (e.g., expected results). In some implementations, testing platform 210 may determine that a field matches between an actual result and an expected result (e.g., is associated with a "pass" designation). For example, testing platform 210 may determine that the AUT processed the test case and generated the same result. Alternatively, testing platform 210 may determine that a field does not match between an actual result and an expected result (e.g., is associated with a "fail" designation). For example, testing platform 210 may determine that the AUT processed the test case and did not generate the same result.

In some implementations, testing platform 210 may compare the actual results and the expected results at a test set level. For example, if all of the fields, a threshold quantity of fields, etc., associated with test cases match between the actual results and the expected results, then testing platform 210 may provide an indication that the test cases match at a test set level. In this way, testing platform 210 may conserve processor and/or memory resources by providing an indication that the test sets match (e.g., which may reduce a need to use processor and/or memory resources to analyze particular test cases and/or fields associated with test cases).

In some implementations, testing platform 210 may compare the actual results and the expected results at a data segment level. For example, a data segment may include a collection of fields associated with a result. In some implementations, if each field associated with a data segment, for a test case, matches between the actual results and expected results, then testing platform 210 may provide an indication that the data segments match. In this way, testing platform 210 may conserve processor and/or memory resources by providing an indication that data segments match between the actual results and the expected results (e.g., may reduce a need of a user to analyze the actual results at a field level). Alternatively, if particular fields associated with a data segment do not match between the actual results and the expected results, then testing platform 210 may provide an indication that the data segments do not match, which may enable a user to analyze the actual results at a field level.

In some implementations, testing platform 210 may compare the first results and the second results at a field level. For example, testing platform 210 may compare the actual results to the expected results on a field by field basis. In this way, a user may identify particular fields associated with the actual results that differ from fields associated with the expected results. In some implementations, testing platform 210 may identify defects associated with the AUT (e.g., functionalities that may be associated with an error) based on a mismatch between fields. Additionally, testing platform 210 may identify fields that may be affected by the defect(s). Additionally, testing platform 210 may identify test scenarios that may be affected by the defects. Testing platform 210 may provide, to client device 205, information that identifies the defects and/or the fields that did not match between the actual results and the expected results.

In some implementations, testing platform 210 may compare the first results and the second results, and may determine whether a particular quantity of data segments, fields, or the like, that match satisfies a threshold. Additionally, testing platform 210 may determine that the particular quantity of data segments, fields, or the like, satisfies the threshold and may provide an indication that the particular quantity satisfies the threshold (e.g., indicating a "pass" designation).

In some implementations, testing platform 210 may exclude particular fields from being compared between the actual results and the expected results. For example, testing platform 210 may not compare particular fields associated with the actual results and the expected results. In some implementations, testing platform 210 may receive, from client device 205, information that identifies particular fields to exclude from comparison. For example, assume that a particular field may have a known discrepancy between the actual results and the expected results (e.g., may be associated with an anticipated difference that may not be associated with an AUT error, such as a bug). In this case, the particular field may be selected to be excluded from being compared between the actual results and the expected results. Additionally, assume that a new functionality associated with the AUT may result in a particular field being different in an actual result as compared to an expected result (e.g., the AUT may generate a different result based on a modification). In this case, the field may be selected to be excluded from comparison.

In some implementations, testing platform 210 may compare actual results and expected results based on a test set, a release, a test environment, or the like. For example, testing platform 210 may receive, from client device 205, information that identifies actual results, associated with a test set, a release, a test environment, or the like, to be compared with expected results. Additionally, testing platform 210 may compare the actual results and the expected results, may store information associated with the comparison, and/or may provide information, associated with the comparison, for display and/or to another device.

In some implementations, testing platform 210 may identify test scenarios that were tested. For example, testing platform 210 may generate a report (e.g., a coverage report) that identifies particular test scenarios that are associated with particular test cases that were tested, and may provide, to client device 205, information that identifies the report. In this way, client device 205 may provide, for display, information that identifies test scenarios that were tested, thereby enabling a user to determine if additional testing is needed.

In some implementations, testing platform 210 may permit and/or cause an action to be performed based on comparing the actual results and the expected results. For example, testing platform 210 may perform an action and/or may cause another device to perform an action based on comparing the actual results and the expected results. In some implementations, testing platform 210 may provide, and/or cause another device to provide, a message to client device 205 based on comparing the actual results and the expected results. For example, testing platform 210 may cause a message (e.g., an email or a short message service (SMS) message) to be sent to client device 205 based on comparing the actual results and the expected results. Testing platform 210 may notify a user (e.g., a subject matter expert, a programmer, a developer, a tester, etc.) that the AUT may be associated with a particular error (e.g., a bug).

Additionally, or alternatively, testing platform 210 may coordinate client devices 205 based on comparing the actual results and the expected results. For example, testing platform 210 may coordinate client devices 205 (e.g., coordinate calendar applications associated with client devices 205 to schedule a meeting), and may provide information identifying a difference between the actual results and the expected results. In some implementations, a user may receive an indication that a meeting has been scheduled to discuss particular issues with the AUT.

Additionally, or alternatively, testing platform 210 may automatically orchestrate additional testing, automatically perform a debugging process on the AUT, automatically analyze code associated with the AUT and suggest a particular correction, automatically identify code associated with a potential defect, or the like, based on comparing the actual results and the expected results.

Implementations described herein may enable testing platform 210 to orchestrate a regression test such that a particular quantity of test data is associated with the regression test (e.g., that adequately provides coverage for multiple scenarios that may be affected to modifications to the AUT). Additionally, implementations described herein may enable testing platform 210 to compare actual results and expected results, which may be associated with multiple releases. In this way, testing platform 210 may provide more accurate regression test coverage, and may minimize a quantity of errors that may go unnoticed (e.g., identify errors with the AUT). Additionally, in this way, testing platform 210 may conserve processor and/or memory resources of a transaction processing system based on providing more thorough testing.

While some implementations described herein are described in terms of testing a healthcare claim processing system, implementations described herein may be applied to other transaction processing systems and/or other AUTs. In practice, these implementations may be used in conjunction with other types of AUTs that are associated with a regression test.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Implementations described herein may enable a testing platform to orchestrate and provide a regression test. For example, implementations described herein may enable a testing platform to identify tests and/or test scenarios associated with an AUT that may be affected by modifications to the AUT. Further, implementations described herein may enable the testing platform to identify test data that corresponds to each test scenario associated with the AUT, thereby increasing an accuracy of regression testing and minimizing a risk of providing inadequate testing. Implementations described herein may enable a testing platform to provide automated regression testing, thereby reducing a quantity of processor and/or memory resources associated with orchestrating and providing a regression test as compared to manual techniques.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive information associated with an application to be tested,
         the application to be tested including modified code, and
         the received information identifying a test;
      identify one or more test scenarios that may be affected by the modified code;
      identify first test data associated with the application to be tested based on the received information and based on identifying the one or more test scenarios;
      identify a plurality of test cases associated with the one or more test scenarios,
         the plurality of test cases being associated with a plurality of expected results;
      generate, based on a user interaction with another device to modify the first test data, second test data associated with a particular test case of the plurality of test cases,
         a modification to the first test data being a modification to a value associated with a dimension that is causing an error;
      provide the particular test case and the second test data to the application to be tested;
      receive an actual result based on providing the particular test case and the second test data to the application to be tested;
      compare the actual result and the plurality of expected results; and
      perform one or more actions based on a difference between the actual result and the plurality of expected results,
         the one or more actions comprising:
            additional testing of the application,
            a debugging of the application, or
            an identification of code associated with a potential defect.

2. The device of claim 1, where the one or more processors are further to:
   receive information that identifies one or more fields to exclude from being compared between the actual result and the plurality of expected results; and
   prevent information associated with the one or more fields from being provided for display.

3. The device of claim 1, where the one or more processors are further to:

provide information for display that identifies the one or more test scenarios.

4. The device of claim 1, where the one or more processors are further to:
identify a data segment, associated with the actual result, that includes a value that does not match another value, associated with another data segment, associated with the plurality of expected results; and
provide information that identifies the data segment.

5. The device of claim 1, where the one or more processors are further to:
receive information that identifies a selection of one or more values associated with one or more dimensions, the first test data including the one or more dimensions; and
associate the first test data with the particular test case based on the selection.

6. The device of claim 1, where the one or more processors are further to:
identify another test scenario associated with the application to be tested;
determine that other test data, associated with the other test scenario, is not available for testing;
provide, to another device, a request for the other test data; and
where the one or more processors, when identifying the first test data associated with the application to be tested, are to:
identify the first test data based on a response to the request.

7. The device of claim 1, where the plurality of expected results includes one or more baseline results generated using at least one known working version of the application to be tested.

8. A non-transitory computer-readable medium storing instructions, the instructions comprising:
one or more instructions that, when executed by one or more processors of a device, cause the one or more processors to:
receive information associated with an application under test,
the application to be tested including modified code, and
the received information identifying a test;
identify one or more test scenarios that may be affected by the modified code;
identify first test data associated with the application based on the received information and based on identifying the one or more test scenarios;
identify a plurality of test cases associated with the one or more test scenarios,
the plurality of test cases being associated with a plurality of expected results;
generate, based on a user interaction with another device to modify the first test data, second test data associated with a particular test case of the plurality of test cases,
a modification to the first test data being a modification to a value associated with a dimension that is causing an error;
provide the particular test case and the second test data to the application to perform a regression test;
receive a plurality of first results based on providing the particular test case and the second test data to the application,
the plurality of first results being actual results;
compare the plurality of first results and a plurality of second results,
the plurality of second results being expected results associated with one or more other regression tests performed prior to performing the regression test; and
perform one or more actions based on a difference between the plurality of first results and the plurality of second results,
the one or more actions comprising:
additional testing of the application,
a debugging of the application, or
an identification of code associated with a potential defect.

9. The non-transitory computer-readable medium of claim 8, where the one or more instructions, when executed by the one or more processors, further cause the one or more processors to:
identify another test scenario associated with the application;
identify one or more dimensions associated with the other test scenario,
the one or more dimensions being associated with potential values; and
where the one or more instructions, that cause the one or more processors to identify the first test data associated with the application, cause the one or more processors to:
identify the first test data based on the one or more dimensions,
the first test data including the potential values.

10. The non-transitory computer-readable medium of claim 8, where the one or more instructions, when executed by the one or more processors, further cause the one or more processors to:
receive information that identifies a selection of one or more values associated with the first test data; and
associate the first test data with the particular test case based on the selection of the one or more values.

11. The non-transitory computer-readable medium of claim 8, where the one or more instructions, when executed by the one or more processors, further cause the one or more processors to:
compare the plurality of first results and a plurality of third results,
the plurality of third results being associated with a first regression test, of the one or more other regression tests, that is different than a second regression test associated with the plurality of second results.

12. The non-transitory computer-readable medium of claim 8, where the one or more instructions, when executed by the one or more processors, further cause the one or more processors to:
identify one or more first fields, associated with the plurality of first results, that do not match corresponding second fields associated with the plurality of second results; and
provide information for display based on the one or more first fields.

13. The non-transitory computer-readable medium of claim 8, where the one or more instructions, when executed by the one or more processors, further cause the one or more processors to:
receive information that identifies a selection of a test environment; and where the one or more instructions, that cause the one or more processors to provide the particular test case and the second test data to the application, cause the one or more processors to:
provide the particular test case and the second test data to the application based on the selection of the test environment.

14. The non-transitory computer-readable medium of claim 8, where the second test data matches a particular test scenario associated with the value associated with the dimension.

15. A method, comprising:
receiving, by a device, information associated with an application to be tested,
the application to be tested including modified code, and
the received information identifying a test;
identifying, by the device, one or more test scenarios that may be affected by the modified code;
identifying, by the device and based on identifying the one or more test scenarios, first test data associated with a test case,
the first test data including multiple dimensions corresponding to the one or more test scenarios;
generating, by the device and based on a user interaction with another device to modify the first test data, second test data associated with the test case,
a modification to the first test data being a modification to a value associated with a dimension that is causing an error;
providing, by the device, the test case and the second test data to the application;
receiving, by the device, an actual result based on providing the test case and the second test data to the application;
comparing, by the device, the actual result and an expected result,
the expected result being associated with another release that is prior to the release; and
performing, by the device, an action based on a difference between the actual result and the expected result,
the action comprising:
additional testing of the application,
a debugging of the application, or
an identification of code associated with a potential defect.

16. The method of claim 15, further comprising:
comparing the actual result and another expected result,
the other release being associated with a test of the application,
the other expected result being associated with another test of the application; and
providing information for display based on comparing the actual result and the other expected result.

17. The method of claim 15, further comprising:
receiving, from another device, a request for the first test data;
determining that the other device is associated with a particular location; and
providing, to the other device, a subset of the first test data based on determining that the other device is associated with the particular location.

18. The method of claim 15, further comprising:
determining that the first test data is not available for testing; and
providing, to another device, a request for the first test data.

19. The method of claim 15, further comprising:
determining that other test data, associated with the test case, is invalid;
identifying one or more dimensions, of the multiple dimensions, associated with the other test data; and
identifying the first test data based on the one or more dimensions.

20. The method of claim 15, further comprising:
receiving a selection of one or more values associated with one or more dimensions of the multiple dimensions,
the one or more dimensions being associated with the one or more test scenarios; and
generating the first test data based on the selection.

* * * * *